(12) United States Patent
Smith

(10) Patent No.: US 12,358,751 B1
(45) Date of Patent: Jul. 15, 2025

(54) MOBILE WIRE SPOOLER

(71) Applicant: Matthew Paul Smith, Lebanon, NH (US)

(72) Inventor: Matthew Paul Smith, Lebanon, NH (US)

( * ) Notice: Subject to any disclaimer, the term of this patent is extended or adjusted under 35 U.S.C. 154(b) by 259 days.

(21) Appl. No.: 18/074,603

(22) Filed: Dec. 5, 2022

Related U.S. Application Data

(60) Provisional application No. 63/287,803, filed on Dec. 9, 2021.

(51) Int. Cl.
*B65H 49/32* (2006.01)
*F16M 7/00* (2006.01)

(52) U.S. Cl.
CPC ............ *B65H 49/324* (2013.01); *F16M 7/00* (2013.01); *F16M 2200/08* (2013.01)

(58) Field of Classification Search
CPC ...... B65G 49/324; B65G 75/403; F16M 7/00; F16M 2200/08; B65H 75/403
USPC .......................................................... 242/557
See application file for complete search history.

(56) References Cited

U.S. PATENT DOCUMENTS

| | | | | |
|---|---|---|---|---|
| 4,473,196 A * | 9/1984 | Sammann | .......... | B65H 75/4489 242/396.6 |
| 4,649,954 A * | 3/1987 | Dunwoody | .......... | B65H 75/403 137/355.27 |
| 5,285,981 A * | 2/1994 | Pavelka | ................. | B65H 49/32 242/129 |
| 5,582,216 A * | 12/1996 | Smith | ..................... | B21F 33/00 140/16 |
| 7,011,270 B1 * | 3/2006 | Chouinard | ............ | E04H 17/266 242/578.2 |
| 7,350,738 B1 * | 4/2008 | Himmelberg | .......... | A01G 20/18 242/422.5 |
| 10,837,196 B2 * | 11/2020 | Cowan | ................... | B65H 49/32 |
| 2004/0065767 A1 * | 4/2004 | Parker | ................... | E04H 17/266 242/594.3 |
| 2006/0124799 A1 * | 6/2006 | Johnson | ................. | B65H 49/32 242/594.3 |
| 2007/0210200 A1 * | 9/2007 | Popp | ..................... | B65H 75/425 242/598.5 |
| 2016/0090266 A1 * | 3/2016 | Brinkerhoff | ............. | B60R 9/06 242/557 |

* cited by examiner

*Primary Examiner* — William A. Rivera
(74) *Attorney, Agent, or Firm* — Loginov & Associates, PLLC; William A. Loginov

(57) ABSTRACT

This invention provides a system for supporting and unwinding/paying out wire from multiple spools, including a framework for supporting the plurality of wire spools. A mount is constructed and arranged to attach to mobile equipment, such as a skid steer. The framework includes forward extended beams that support a plurality of removable axles. There are axles adapted to rotatably retain a plurality of spools of wire therealong. A plurality of removable sleeves are located along each of the axles that retain the spools, respectively, against motion therealong. A levelling assembly allows the axles to tilt relative to an angle at which the equipment is disposed. The spools can be held laterally along each respective axle by clamping sleeves/spacers.

15 Claims, 5 Drawing Sheets

MOBILE WIRE SPOOLER

RELATED APPLICATION

This application claims the benefit of U.S. Provisional Application Ser. No. 63/287,803, entitled MOBILE WIRE SPOOLER, filed Dec. 9, 2021, the teachings of which are incorporated herein by reference.

FIELD OF THE INVENTION

This invention relates to mechanisms for carrying and paying out wire and other wound materials from mounted spools, and more particularly to mobile wire spool-carrying devices.

BACKGROUND OF THE INVENTION

It is often challenging to install wiring on a jobsite located in rough terrain and/or remote areas. Wire is supplied on heavy spools that are cumbersome to move manually. Wheeled hand equipment containing spools can also prove cumbersome to move about the site, and may become mired in mud or rubble.

Heavy equipment, such as wheeled and tracked skid steers and forklifts are adapted to maneuver in rough and/or remote terrain. Thus it is desirable to leverage their mobility with a mechanism to transport and manipulate spools of wire.

SUMMARY OF THE INVENTION

This invention overcomes disadvantages of the prior art by providing an apparatus/system/device that allows for dramatic efficiency and throughput gains to electricians pulling large quantities of wire, especially in remote installations or where terrain is rough. The system, and associated method for use, provides increased mobility by utilizing heavy equipment typically found on the jobsite not only for material handling, but also as the primary fixturing system for the entire wire dispensing operation. The invention is flexible to be adapted to a wide array of standard equipment loader connection types. The invention allows the electrician (or other worker) to move and dispense numerous spools of wire without (free of) a need to off-load or reload the system, thereby offering increased efficiency over standard wire pulling practices used currently in industry. Due to increased stability of this dispensing system (also termed a spooling system), wire can be successfully pulled faster and with greater force, without risk of the spools coming off of (axially detaching from) their respective dispensing fixtures as is common when using spool jacks (the current industry standard). The system also advantageously reduces or eliminates much of the heavy lifting traditionally involved with pulling wire at a jobsite, which often entails placing of wire spools/reels onto the typical industry standard "wire jacks". Moreover, the system saves time because it can allow for loading of load multiple (e.g. eight) reels at same time and be leveled with the push of button by the user.

In an illustrative embodiment a framework, and mobile equipment mounting the framework is provided, arranged for supporting a plurality of spools of wire. The framework includes a mount, constructed and arranged to attach to the mobile equipment. Forward extended beams support a plurality of removable axles The axles are adapted to rotatably retain the plurality of the spools of wire therealong. A plurality of removable sleeves are located along each of the axles that retain the spools, respectively, against motion therealong. A levelling assembly allows the axles to tilt relative to an angle at which the equipment is disposed. Illustratively, removable clamping sleeves are located on the axles, at ends thereof, to prevent lateral sliding of each of the axles with respect to the beams. Spacer sleeves can retain the spools in a spaced apart arrangement along each of the axles, respectively, and at least some of the spacer sleeves can be constructed and arranged to removably clamp against movement along each the axles, respectively. The clamping sleeves, and at least some of the spacer sleeves, support a turn screw that removably engages at least one of the axles, respectively. Posts on the framework can be arranged to carry spare spacer sleeves. The levelling assembly can include hydraulic actuators and lines/hoses that extend form a hydraulic pump. Illustratively, the mobile equipment unit can have a lifting mechanism that allows for mounting of accessories, including a mount on the framework.

BRIEF DESCRIPTION OF THE DRAWINGS

The invention description below refers to the accompanying drawings, of which.

DETAILED DESCRIPTION

Figure 1:
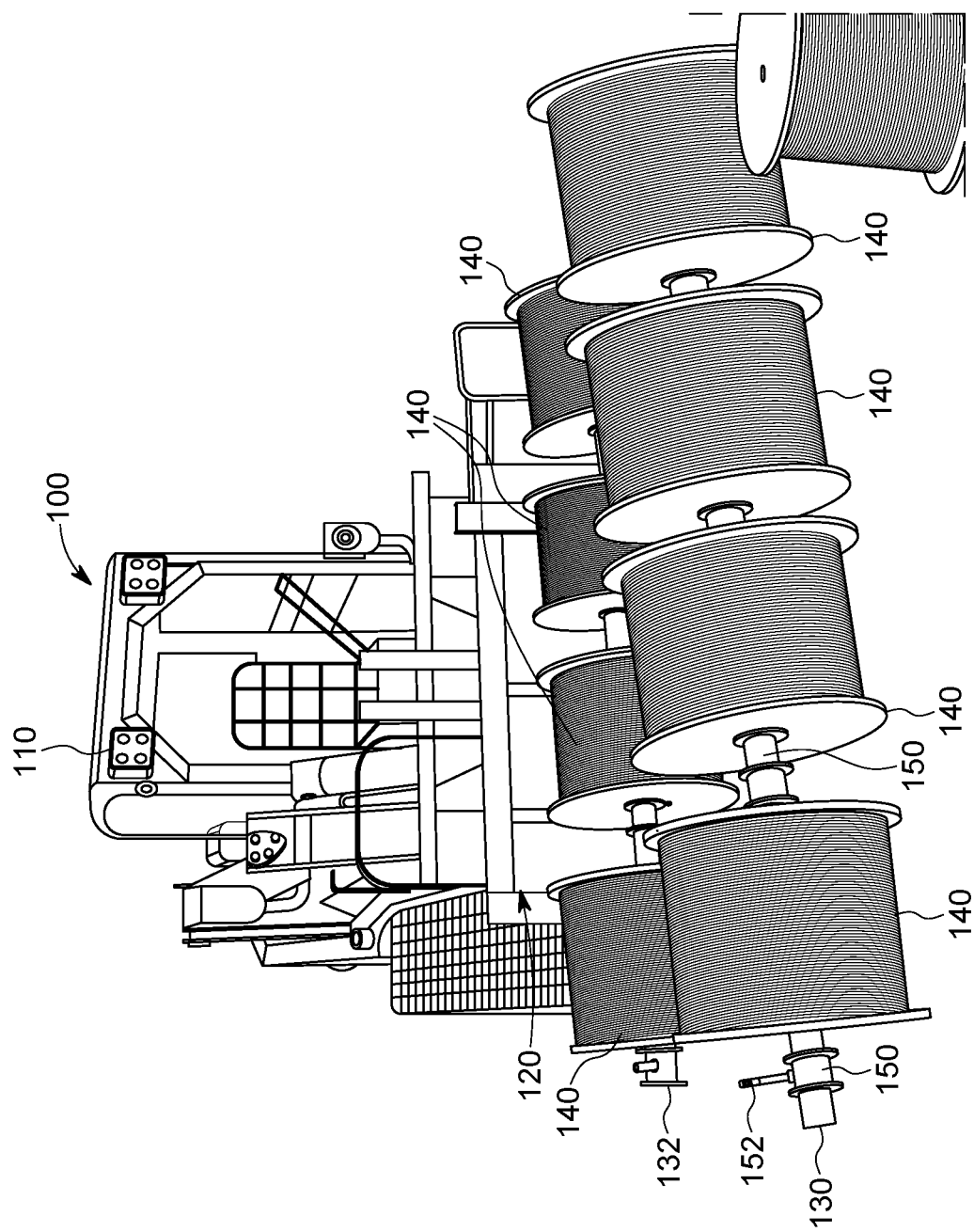
FIG. 1 is a diagram showing an exemplary mobile equipment (e.g. a skid steer) supporting a wire spooling framework according to an exemplary embodiment.
Figure 2:
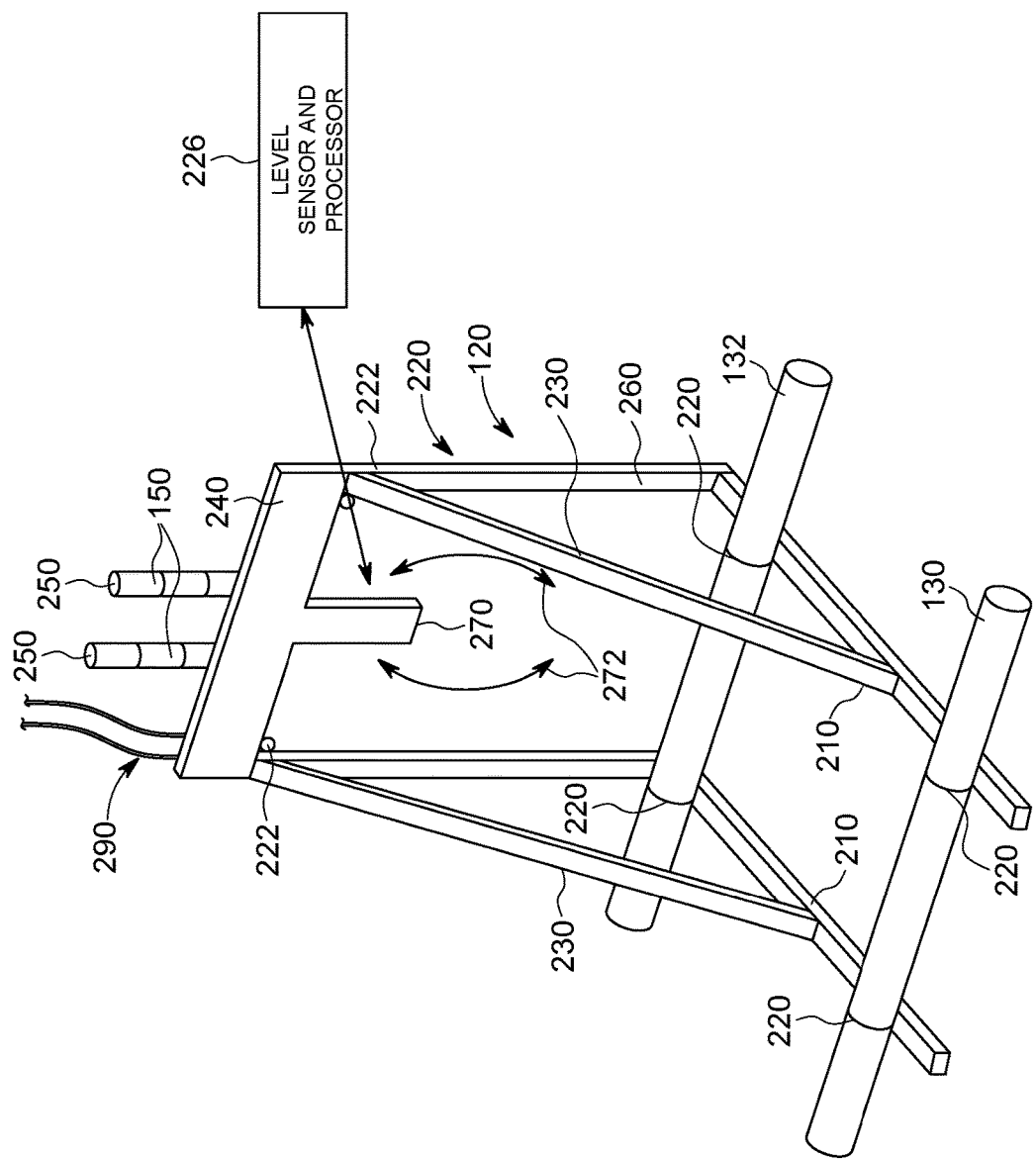
FIG. 2 is a schematic diagram of spooling system framework according to FIG. 1.

FIG. 1 shows a wire spooling system 100 that includes an exemplary skid steer 110, which carries a spool framework 120 according to an illustrative embodiment. The framework 120 includes front and rear axles 130 and 132, respectively. By way of non-limiting each example, each axle carries four spools 140 of wire. Each spool 140 is separated from the others by a spacer (collar) 150 that can be secured to the respective axle 130 or 132 by a turn screw 152. With further reference to a schematic diagram of the framework 120 in FIG. 2, the axles 130 and 132 are supported on a pair of side-by-side beams or forks 210. The beams 210 include welded-on sleeves 220 with turn screws or other clamps that secure the axles in a lateral direction. The beams 210 are supported on an upright vertical frame 220 in a manner that allows the uprights 222 to be adjusted laterally (left-to-right). Supporting cables or rods 230 are located between the top of the frame 220 and the front of each fork/beam 210. The top of the frame 220 comprises a crossbeam 240, which can support vertical posts 250 that carry spare sleeves 150.

The frame 220 includes a lower crossbeam 260 that supports the forks/beams 210. The overall arrangement of the framework 120 allows it to be attached to the tool mounting of skid steer or other piece of mobile equipment. Such mounting arrangements should be clear to those of skill in the art.

Notably, the framework 120 includes a leveler assembly 270, which allows the framework and carried spools to rotate (double curved arrows 272) so as to remain level even when the equipment is disposed that an angle. The leveler assembly can be operated automatically based upon a sensor and associate processor 276, and associated actuator system or can be manually actuated to varying angles by the user. An appropriate hydraulic pump and interconnected hydraulic actuators/rams are provided to effect the level of the framework relative to the tilt angle of the mobile equipment. The feed hoses 290 are depicted. The hoses 290 can be attached to an auxiliary pump associated with the framework 120 or a pump that is part of the equipment unit (skid steer).

Figure 3:
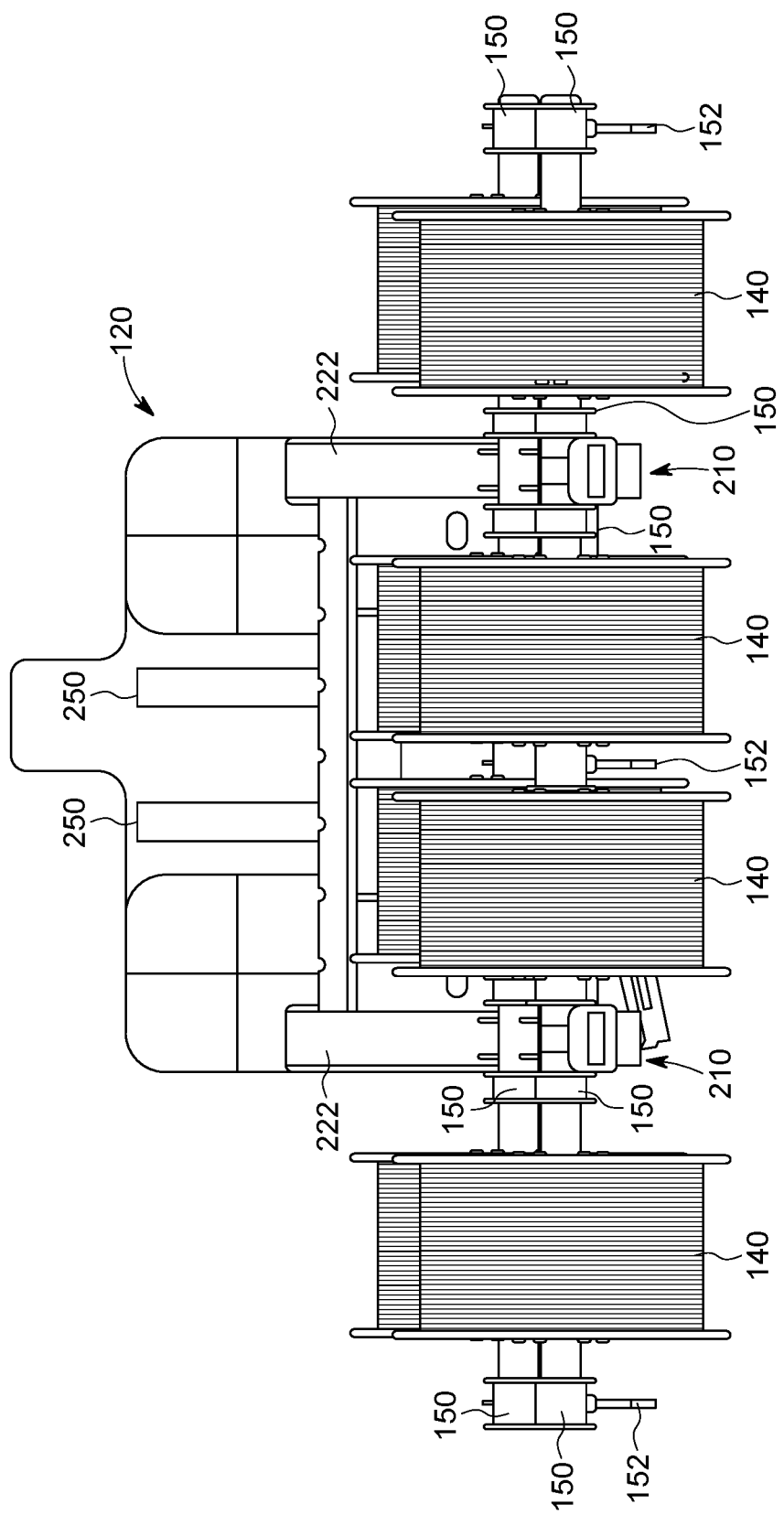
FIG. 3 is a more detailed from view of the framework of FIG. 1 with a plurality of wire spools mounted thereon.
Figure 4:
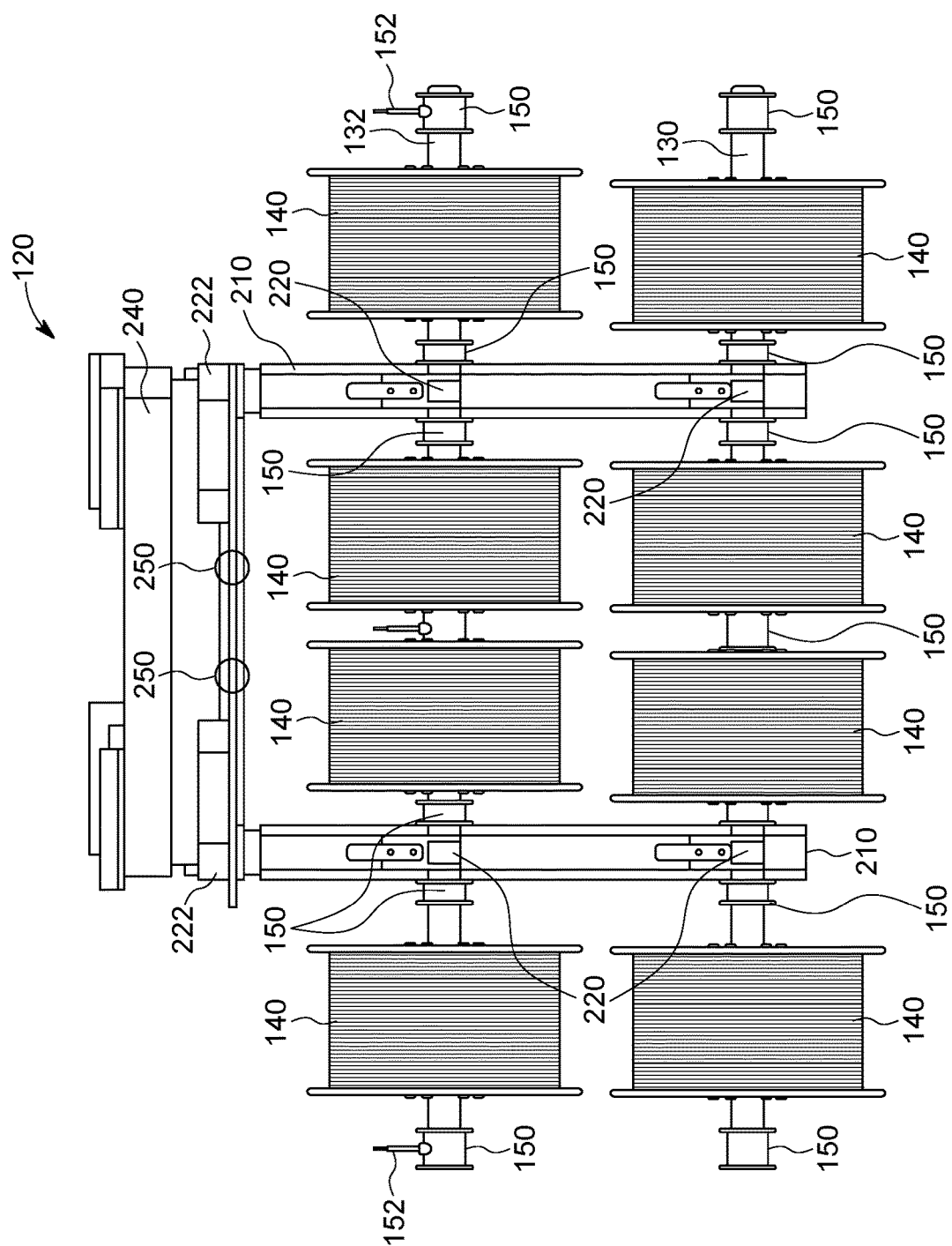
FIG. 4 is top view of the framework shown in FIG. 3.

With further reference to FIGS. 3 and 4, the framework 120 is shown in further detail. Each spool 140 is held laterally on an axle 130, 132 by a pair of sleeves 150 that are secured to the axle (removably) using the above-described turn screws 152. The spools 140 are mounted by sliding the axles through the beam-mounted sleeves 220 while threading spools 140 and retaining sleeves or collars 150 in appropriate lateral locations. The outer sleeves or collars 150 are then secured laterally using turn screws 152. The central sleeves or collars 150 can remain unsecured to the axle in various implementations and act as spacers (see spacer 550 below). For example, the sleeves disposed between the two central spools on each axle 130, 132 can remain unsecured. The beams 210 serve to capture the two central spools laterally. It should be clear that the framework 120 herein can be constructed based upon a conventional skid steer fork it certain embodiments.

Figure 5:
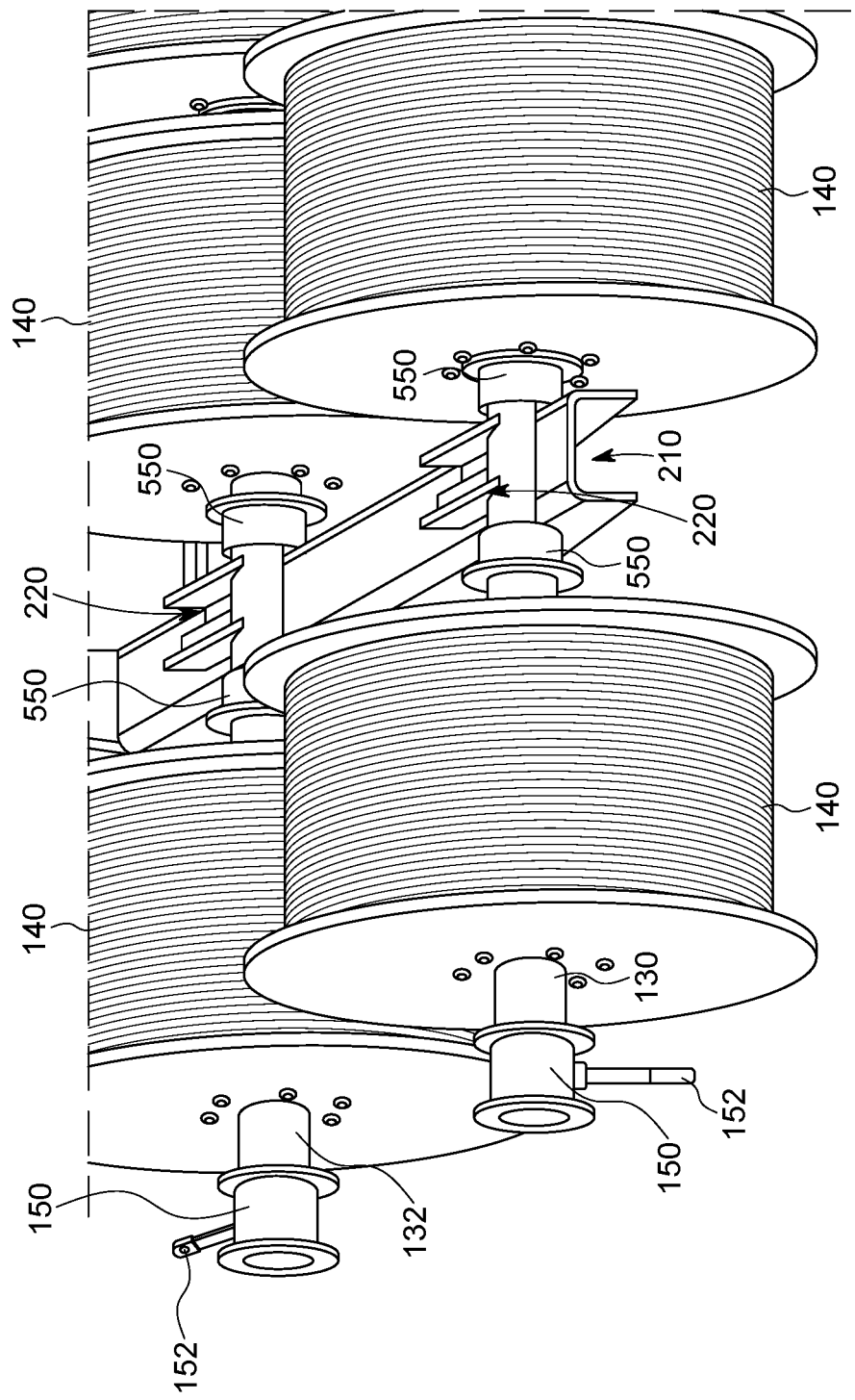
FIG. 5 is a more detailed, partial perspective view of the framework shown in FIG. 3.

With reference to FIG. 5, the securing of the axles 130, 132 to a beam 210 is shown in further detail. Note that the retaining structures 220 that securing each axle 130, 132 to their respective beam 210 can be overlying fingers, which can be movable or fixed. Note also that the sleeves or collars 150 on the outer end of each axle include laterally securing turn screws 152. Advantageously, the sleeves allow the spools to be placed laterally so that wire paid therefrom is free of entanglement with the wire paid from other spools.

The dimensions of the various components can be sized appropriately to existing industry standards. For example the axles can each have in diameter that is sized to accommodate a standard-diameter spool hole. The axles can be solid or tubular depending on strength and weight requirements. Also while the framework 120 is shown supporting eight spools, a greater or lesser number of spools can be accommodated in alternate embodiments.

Notably, while a skid steer is used as an example of mobile (or portable) equipment unit herein, the system can be adapted for use with almost any piece of heavy equipment (e.g. skid steer, tractor, loaded, telehandler, excavator, fork lift, etc.) providing, as part of the system options, for various attachment styles and hydraulic fitting types. In the depicted example of a skid steer, the framework 120 is attached in conventional manner and the hydraulic hoses 290 are connected to the equipment's hydraulic system.

It should be clear that the spooling system herein allows for dramatic efficiency and throughput gains to electricians pulling large quantities of wire, especially in remote installations or where terrain is rough. This system alleviates inconvenience and extra time entailed in picking up the wire and moving to multiple locations, while trying to get it level with ground mount wire jacks-which can be heavy and tip over often causing delays during a project at a jobsite. The system further provides increased mobility by utilizing heavy equipment typically found on the jobsite, not only for material handling, but also as the primary fixturing system for the entire wire dispensing operation. The system is flexible to be adapted to a wide array of standard equipment loader connection types. The system additionally allows the electrician, or other user, to move and dispense numerous spools of wire without (free of) the need to off-load or re-load the system, offering increased efficiency over standard wire pulling practices. Due to increased stability of this dispensing system, wire can be successfully pulled faster and with greater force, without risk of the spools coming off of their dispensing fixtures as is common when using spool jacks (the industry standard).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A framework for supporting a plurality of spools of wire comprising:
    a mount constructed and arranged to attach to mobile equipment;
    forward extended beams that support a plurality of removable axles, the axles adapted to rotatably retain the plurality of the spools of wire therealong;
    a plurality of removable sleeves located along each of the axles that retain the spools, respectively, against motion therealong; and
    a levelling assembly that allows the axles to tilt to an angle relative to horizontal that is different than an angle relative to horizontal at which the equipment is disposed.

2. The framework as set forth in claim 1, further comprising, removable clamping sleeves located on the axles at ends thereof to prevent lateral sliding of each of the axles with respect to the beams.

3. The framework as set forth in claim 2, further comprising, spacer sleeves that retain the spools in a spaced apart arrangement along each of the axles, respectively.

4. The framework as set forth in claim 3 wherein at least some of the spacer sleeves are constructed and arranged to removably clamp against movement along each the axles, respectively.

5. The framework as set forth in claim 4 wherein the clamping sleeves and at least some of the spacer sleeves support a turn screw that removably engages at least one of the axles, respectively.

6. The framework as set forth in claim 4, further comprising, posts on the framework that are arranged to carry spare spacer sleeves.

7. The framework as set forth in claim 1 wherein the levelling assembly includes hydraulic actuators and lines/hoses that extend from a hydraulic pump.

8. A mobile equipment unit having a lifting mechanism that allows for mounting of accessories thereon comprising:
- a framework for supporting a mount constructed and arranged to attach to the mobile equipment;
- forward extended beams that support a plurality of removable axles, the axles adapted to rotatably retain a plurality of spools of wire therealong;
- a plurality of removable sleeves located along each of the axles that retain the spools, respectively, against motion therealong; and
- a levelling assembly that allows the axles to tilt to an angle relative to horizontal that is different than an angle relative to horizontal at which the equipment is disposed.

9. The mobile equipment unit as set forth in claim 8, further comprising, removable clamping sleeves located on the axles at ends thereof to prevent lateral sliding of each of the axles with respect to the beams.

10. The mobile equipment unit as set forth in claim 9, further comprising, spacer sleeves that retain the spools in a spaced apart arrangement along each of the axles, respectively.

11. The mobile equipment unit as set forth in claim 10 wherein at least some of the spacer sleeves are constructed and arranged to removably clamp against movement along each the axles, respectively.

12. The mobile equipment unit as set forth in claim 11 wherein the clamping sleeves and at least some of the spacer sleeves support a turn screw that removably engages at least one of the axles, respectively.

13. The mobile equipment unit as set forth in claim 11, further comprising, posts on the framework that are arranged to carry spare spacer sleeves.

14. The mobile equipment unit as set forth in claim 8 wherein the levelling assembly includes hydraulic actuators and lines/hoses that extend from a hydraulic pump.

15. The mobile equipment unit as set forth in claim 8 wherein the mobile equipment comprises at least one of a skid steer, tractor, loaded, telehandler, excavator, and fork lift.

* * * * *